Figure 1:
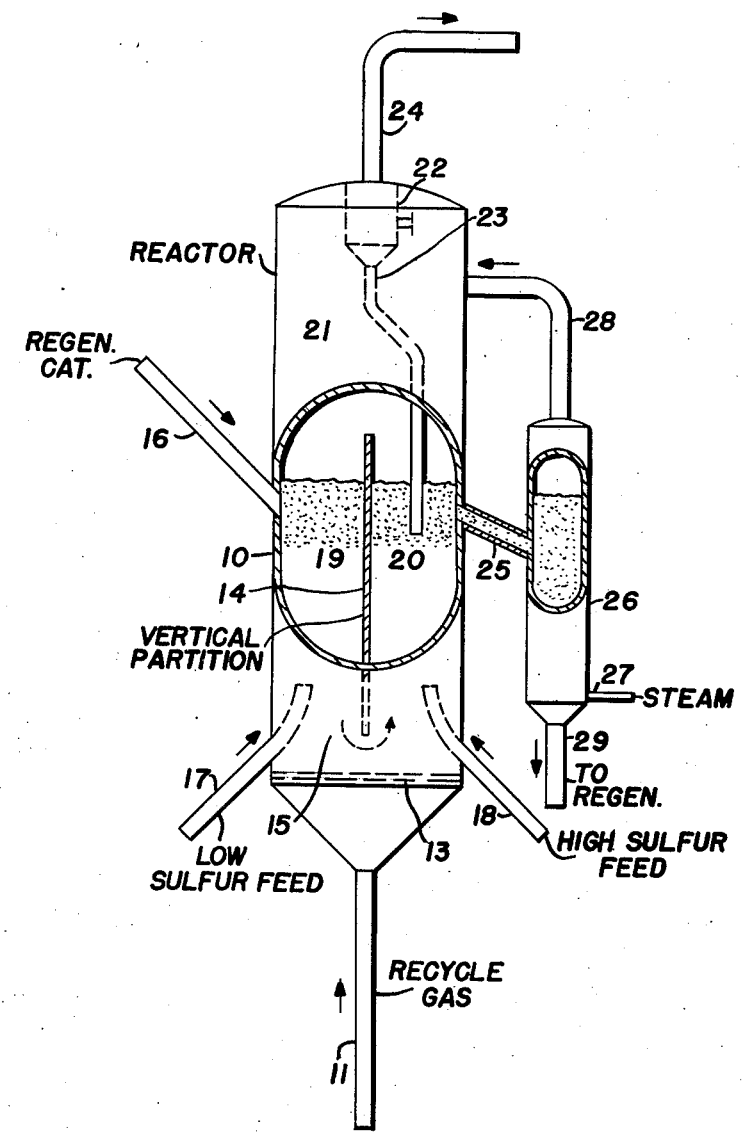

Oct. 1, 1957  E. W. S. NICHOLSON ET AL  2,808,366
HYDROFORMING HIGH SULFUR FEED STOCKS
Filed Dec. 23, 1952  2 Sheets-Sheet 1

Edward W. S. Nicholson
Alexis Voorhies, Jr.  Inventors

By H. M. Feyrer  Attorney

United States Patent Office 2,808,366
Patented Oct. 1, 1957

2,808,366

HYDROFORMING HIGH SULFUR FEED STOCKS

Edward W. S. Nicholson and Alexis Voorhies, Jr., Baton Rouge, La., assignors to Esso Research and Engineering Company, a corporation of Delaware Application December 23, 1952, Serial No. 327,562

4 Claims. (Cl. 196—50)

This invention pertains to hydrocarbon conversion processes and particularly to the reforming or hydroforming of lower boiling naphtha fractions of high sulfur content and low octane rating into low sulfur containing products rich in aromatics and having good anti-knock properties by the fluidized solids technique.

Hydroforming is a well known process for treating hydrocarbon fractions boiling within the motor fuel or naphtha range to upgrade the same or increase the aromaticity and improve the anti-knock characteristics of said hydrocarbon fractions. By hydroforming is ordinarily meant an operation carried out at elevated temperatures and pressures in the presence of solid catalyst particles and hydrogen, whereby the hydrocarbon fraction is increased in aromaticity through dehydrogenation of naphthenes and dehydrogenation, isomerization and cyclicization of paraffins in which operation there is no net consumption of hydrogen. Hydroforming operations are ordinarily carried out in the presence of hydrogen or hydrogen-rich recycle gas, i. e. at relatively high hydrogen partial pressures in the pressure range of from about 50 to 1000 lbs. per sq. inch at temperatures of from about 750 to 1150° F. and in contact with such catalysts as molybdenum oxide, chromium oxide, or in general, oxides or sulfides of metals of groups IV to VIII of the periodic system of elements alone, or preferably supported on a carrier or spacing agent such as alumina gel, precipitated alumina or zinc aluminate spinel.

It has been proposed to effect the reforming or hydroforming of naphtha fractions in a fluidized solids reactor system in which naphtha vapors are passed continuously through a dense, fluidized bed of catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid reforming or hydroforming as thus conducted has several fundamental advantages over fixed bed hydroforming such as (1) the operations are continuous, (2) the vessels can be designed for single rather than dual functions, (3) the reactor temperature is substantially constant throughout the dense bed, (4) the regeneration or reconditioning of the catalyst can be readily controlled and (5) the freshly regenerated catalyst can be utilized to carry at least part of the heat required for the reforming reaction from the regeneration zone into the reaction zone.

It has been found, however, that serious difficulties are encountered in the normal operation of a fluid hydroforming reactor system when a high sulfur content feed stock or naphtha containing about 0.05–0.10% sulfur or more is charged to the system. Analysis of the catalyst has shown that the sulfur is picked up in the reactor by the molybdenum in the catalyst as a sulfide. The sulfur-containing catalyst is then transported to the regenerator and the sulfur in the molybdenum sulfide is converted in the roasting to $SO_2$ and $SO_3$. That sulfur converted to $SO_2$ is released in the regenerator vent gas, but substantial amounts of sulfur are oxidized to $SO_3$ which remains on the catalyst and is converted to sulfates which are not removed on further oxidation. Since the regeneration fails to remove the sulfur completely, there is a gradual accumulation or increase in the sulfur content of the catalyst. It has been found, moreover, that when the catalyst contains about 0.11 wt. percent of sulfur, the relative catalyst activity is about 80% and when the catalyst contains about 0.25 wt. percent sulfur, the relative catalyst activity is only about 50% of the activity of a catalyst containing no sulfur. The relative catalyst activity is equal to w./hr./w. divided by the initial w./hr./w. of the fresh or sulfur-free catalyst to give a constant octane number. In other words, when the catalyst has accumulated 0.25 wt. percent of sulfur, it is necessary to cut the feed rate in half in order to obtain a product of the desired octane number.

It is the object of this invention to provide the art with an improved fluid hydroforming process.

It is the further object of this invention to provide the art with an improved method of reforming high sulfur-containing feed stocks by the fluidized solids technique.

It is also an object of this invention to provide the art with a method of reforming high sulfur-containing feed stocks in a fluid solids reactor system while avoiding deactivation of the catalyst by the accumulation of sulfur deposits thereon.

These and other objects will appear more clearly from the detailed specification and claims appearing below.

It has now been found that the loss in catalyst activity that normally occurs in running high sulfur content feeds in a fluid hydroforming system can be circumvented by contacting freshly regenerated catalyst first with a low sulfur feed and then with the high sulfur naphtha feed. In this operation, the catalyst is first covered with a deposit of carbon from the low sulfur feed and no sulfur compounds are adsorbed on the active centers. When the partially carbonized catalyst then contacts the high sulfur feed, additional carbon and any sulfur compounds are deposited on top of the previously deposited carbon, or at least not on the most active centers which are already deactivated by carbon. The catalyst is then transferred to the regenerator where all of the sulfur and the carbon can be removed. The complete removal of the sulfur is facilitated by the presence of carbon in intimate association with the sulfur since the carbon serves to maintain a reducing atmosphere around the active centers of the catalyst so that sulfur dioxide is formed rather than $SO_3$ and the $SO_2$ is readily swept off the catalyst.

Figure 2:
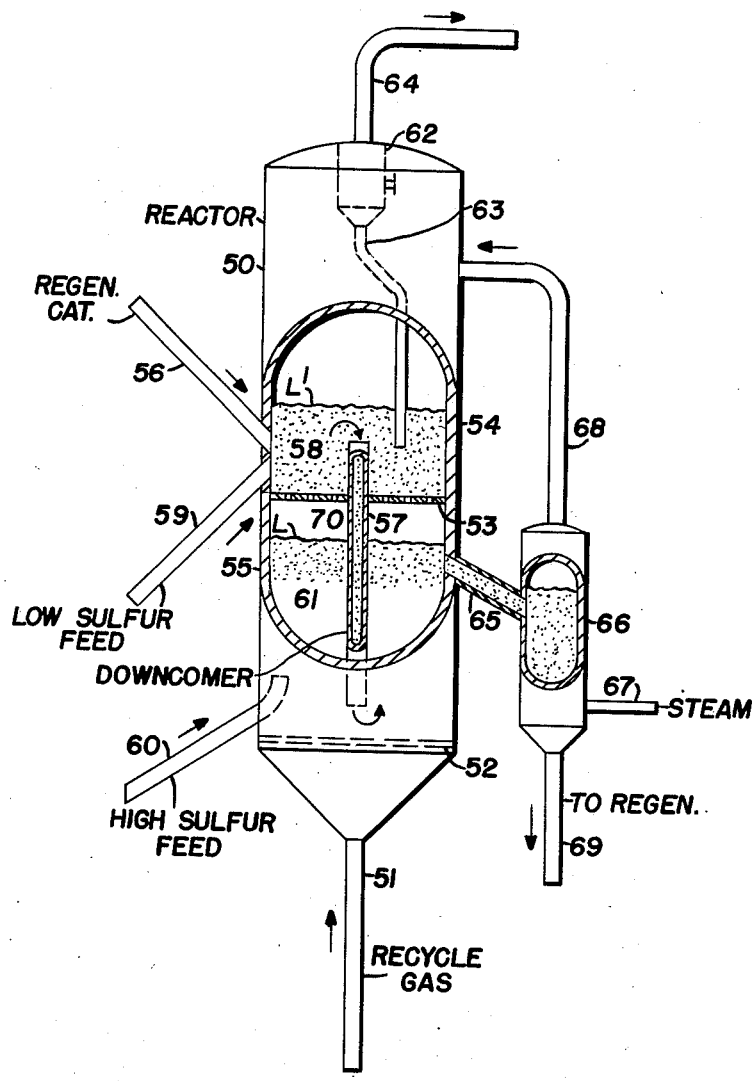

Reference is made to the accompanying drawing which illustrates in Fig. 1 a vertical cross section of a reactor provided with a vertical partition or baffle for providing two reaction zones and in Fig. 2, a vertical cross section of a reactor with a horizontal baffle for providing two reaction zones.

Referring to Fig. 1, 10 is a reactor vessel which may desirably be a vertical cylindrical vessel of considerable length or height. An inlet line 11 is provided at the bottom of the vessel for supplying hydrogen or hydrogen-rich recycle gas to the bottom of the vessel. A perforated plate or grid 13 is arranged at the bottom of the vessel 10 in order to insure uniform distribution of the hydrogen-containing gas over the entire cross-section of the vessel. A vertical partition 14 is arranged within the reactor vessel with its lower end spaced above the top of the perforated plate or distribution grid 13 to provide a passageway 15 for the passage of catalyst particles as will be described below.

Catalyst is charged to the reactor vessel through inlet line 16. The catalyst is either hot, freshly regenerated catalyst or it is regenerated catalyst that has been pretreated by contact with a hydrogen-containing gas at or near regeneration temperature for a very short time, i. e., less than 15 seconds and preferably less than 5 seconds or at lower temperatures, say below about 1025–1050° F, in which operation it is not essential to keep the time of contact so short.

A low sulfur feed stock, i. e., containing less than about 0.01% sulfur is charged to the reactor through inlet line 17 which terminates in a suitable distributing ring or nozzle on the same side of the verticle partition or baffle 14 to which the regenerated catalyst is supplied. A high sulfur feed stock, i. e., containing more than about 0.05% sulfur is charged to the reactor vessel through inlet line 18 which also terminates in a suitable distributing ring or nozzle but on the opposite side of partition or baffle 14 to that where the regenerated catalyst is supplied. The velocity of the recycle gas and naphtha vapors passing upwardly through the reactor is controlled to form a dense fluidized bed 19 of freshly regenerated catalyst and low sulfur feed on one side of the partition or baffle 14 and a dense fluidized bed 20 of used catalyst and high sulfur feed on the other side of said partition. The dense beds 19 and 20 have a level that is below the top of partition 14.

Vaporous and gaseous reaction products pass overhead from each of the dense beds 19 and 20 and become mixed together in the dilute or disperse phase 21 in the upper part of the reactor vessel. These reaction products are withdrawn through a cyclone separator 22 or the like which serves to separate substantially all of the entrained catalyst particles from the products. The separated catalyst particles are returned to dense bed 20 through the dip leg 23 attached to the bottom of cyclone separator 22. Product vapors and gases are taken overhead through outlet line 24 and passed to suitable product recovery, processing and storage equipment.

Spent catalyst particles are withdrawn through outlet line 25 into a stripper cell or section 26. A stripping gas such as steam, light gaseous hydrocarbons or hydrogen is introduced into the stripping cell 26 through inlet line 27 near the bottom thereof. The stripping gases and the stripped out materials pass overhead through line 28 into the upper portion of the reactor vessel for intermixture and handling with the main body of reaction products. The stripped spent catalyst is withdrawn from the bottom of the stripper cell 26 through conduit 29 and passed to a separate regenerator vessel wherein carbonaceous deposits and sulfur are burned off the spent catalyst preferably in a dense, fluidized, liquid-simulating bed similar to that maintained in the reactor vessel shown.

Fig. 2 shows an alternative method of processing a high sulfur feed stock. In Fig. 2, 50 is a tall cylindrical reactor vessel that is provided with an inlet line 51 for the introduction of hydrogen or hydrogen-rich recycle gas into the bottom of the vessel. A horizontal perforated plate or grid 52 is arranged near the bottom of the reactor vessel in order to distribute the hydrogen or recycle gas uniformly over the entire cross-section of the reactor vessel.

A horizontal grid member 53 is arranged within the vessel to divide it into an upper section 54 and a lower section 55.

Catalyst is charged to the reactor vessel through inlet line 56. The catalyst is the same as that supplied through inlet line 16 in Fig. 1. A downcomer conduit 57 is provided in the reactor with its upper end extending above the grid member 53 a sufficient distance to insure the maintenance of a dense bed 58 of the desired depth in upper section 54. The conduit 57 extends downwardly from the grid 53 to the lower part of section 55 for conveying partially spent or carbonized catalyst from the upper section to the lower section.

The low sulfur feed stock is supplied through inlet line 59 which terminates in a suitable distributing ring or nozzle preferably just above the grid member 53. If desired, however, the low sulfur feed stock can be supplied just below grid 53 and the grid can be utilized to distribute the low sulfur feed uniformly over the entire cross section of the reactor vessel. High sulfur feed is charged to the reactor through inlet line 60 which terminates in a suitable distributing ring or nozzle in the lower portion of section 55 or adjacent to grid member 52.

Vaporized high sulfur feed naptha and recycle gas are passed through the lower portion 55 of the reactor vessel at a rate sufficient to form a dense, fluidized bed 61 having a definite level L. The vapors and gases pass overhead from dense bed 61 into the dilute phase 70 between the dense bed level L and the grid 53. The vapors and gases pass through grid 53 where they are combined with vapors of the low sulfur feed supplied through line 59. The velocity of the vapors is controlled to maintain a dense fluidized bed 58 on grid 53 and having a definite level L'. It may be desirable to make the upper part of the reactor vessel of larger diameter to allow for additional feed vapors supplied through inlet line 59.

Vaporous and gaseous reaction products pass overhead through cyclone separator 62 to outlet line 64 and thence to product recovery equipment as in Fig. 1. The catalyst separated by cyclone separator 62 is returned to the dense bed 58 through dip leg 63.

Spent catalyst particles are discharged directly from dense bed 61 through withdrawal line 65 into the stripping cell 66 which is supplied with stripping gas through inlet line 67 and is vented through line 68 into the dilute phase in the upper part of the reactor. Stripped catalyst is withdrawn through line 69 and passed to the regenerator where carbonaceous deposits and sulfur are removed preparatory to recycling to the reactor.

In both of the reactors shown in the drawing and described above, freshly regenerated catalyst is contacted with a low sulfur feed under reforming conditions in order to deposit carbon substantially free of sulfur. The carbonized catalyst is thereupon contacted with high sulfur feed naptha in a second reaction stage maintained under reforming conditions whereby additional carbonaceous material and sulfur is deposited on the catalyst which is then stripped of entrained or adsorbed vaporizable material and then freed of carbon and sulfur in the regenerator.

It will be understood that the reactor vessels described above will be used in combination with a regenerator to which the catalyst withdrawn from the reactor is charged for regeneration by burning carbonaceous or other combustible materials. While the regenerator may be of any desired type, it is particularly advantageous to carry out the regeneration of the spent catalyst in stages. In staged regeneration, the vessel is similar in construction to the reactor vessel shown in Fig. 2. The spent catalyst is introduced into the upper part of the vessel and the regenerating gas or air is introduced into the bottom zone. Thus by the time the regeneration gases reach the upper zone, a substantial part of the oxygen will have been consumed. The spent catalyst first contacts regeneration gases of low oxygen content. This is especially advantageous since low oxygen partial pressure is conducive to the formation of $SO_2$ rather than $SO_3$. The partially regenerated catalyst then passes to the lower or second zone where complete or substantially complete removal of the remaining carbonaceous deposits is effected. Spent catalyst withdrawn from the reactor and regenerated catalyst withdrawn from the regenerator may be transferred from one side of the reactor system to the other by a standpipe dilute phase riser or by a U-bend transfer system in known manner. The regenerated catalyst may be given a pretreatment with hydrogen or hydrogen-rich gas before recycling or charging to the reactor.

The feed or charging stock to the hydroforming reactor may be a virgin naphtha, a cracked naphtha, a Fischer-Tropsch naphtha or the like having a boiling range of from about 125 to 450° F. or it may be a narrow-boiling cut within this range. The feed charged to the reaction zone to which the freshly regenerated catalyst is charged should contain a negligible amount of sulfur, say less than 0.01% while the naphtha charged to the second reaction zone may contain upwards of about 0.05% sulphur. If a feed stock containing between about 0.01 and 0.05% sulfur is to be processed, it is first subjected to laboratory or pilot plant evaluations to determine whether the sulfur compounds it contains have an appreciably adverse effect on catalyst performance. If they do have an appreciably adverse effect, the naphtha is contacted with the partially deactivated catalyst in the reactor in a manner similar to that used for high sulfur feeds containing over about 0.05% sulfur. If the sulfur compounds are of such a nature or so low in concentration that they have relatively little effect on catalyst performance, the naphtha may be fed to the section of the reactor wherein it is contacted with freshly regenerated catalyst in a manner analogous to that used for low sulfur feed stocks. The feed stock is ordinarily preheated to about 800–1050° F., preferably about 950° F. Thermal degradation of the feed naphtha at preheat temperatures can be minimized by limiting the time of residence thereof in the transfer and feed inlet lines.

Hydrogen-rich gas or recycle gas containing about 50 to 80 volume percent hydrogen is preheated to temperatures of about 1050–1200° F. and passed through the reaction zones at a rate of from about 1000 to 8000 cu. ft. per barrel of naphtha feed.

The reactor system is charged with a mass of finely divided hydroforming catalyst particles. Suitable catalysts include group VI metal oxides such as molybdenum oxide, chromium oxide, tungsten oxide or vanadium oxide or mixtures thereof preferably disposed upon a support or carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium, ceria or potassia can be included in the catalyst. The catalyst particles are, for the most part between 200 and 400 mesh in size or about 0 to 200 microns in diameter with a major proportion between 20 and 80 microns.

The hydroforming reactor vessel is operated at temperatures between about 850 and 950° F. and at pressures of from about 50 to 500 lbs. per sq. inch. Small amounts of water vapor (about 0.5 to about 3.0 mol. percent) are present in the reaction zone, due principally to the presence of water in the feed and in the recycle gas and also due to the formation of water in the regeneration of the spent catalyst as well as the reduction of the regenerated catalyst in the pretreater or in the reactor vessel itself. The presence of these small amounts of water permits operation of the reactor at higher temperatures without loss in selectivity than is possible in systems lacking this small water partial pressure.

Regeneration of the spent reactor catalyst is effected at substantially the same pressure as is maintained in the hydroforming reaction zone and at temperatures of about 1100–1200° F. The average residence time of the catalyst in the reactor is from about 3 to 4 hours while the average residence time of the catalyst in the regenerator or under regeneration conditions is from about 5 minutes to about an hour or more.

The weight ratio of catalyst to oil introduced into the reactor is about 0.5 to about 5.0. Ordinarily it is preferred to operate at catalyst to oil ratios of about 1.0 since higher ratios tend to give excessive carbon formation. Somewhat higher weight ratios can be used at higher pressures.

The space velocity or the weight in pounds of feed charged per hour per pound of catalyst in the reactor depends upon the age or activity level of the catalyst and the desired octane number of the product. Space velocity for a molybdenum oxide upon alumina gel catalyst may vary, for example, from about 1.5 w./hr./w. to about 0.15 w./hr./w. In the operation in accordance with Fig. 1, the w./h./w. may be the same on both sides of the baffle or it may be varied to take into account the difference in activity of the equilibrium catalyst in the two zones. In the case of Fig. 2, the w./hr./w. in the upper bed will be the sum of the w./hr./w. for each fresh feed alone, but probably the most significant number is the w./hr./w. of fresh feed to the upper section because the feed from the lower section would be substantially completely converted.

The foregoing description contains a limited number of embodiments of the present invention. It will be understood, however, that this invention is not limited thereto since numerous variations are possible without departing from the scope of the present invention.

What is claimed is:

1. An improved fluidized solids hydroforming process which comprises the steps of maintaining in a reaction zone contiguous dense fluidized beds of particulate metal oxide-containing hydroforming catalyst, the first of said beds comprising freshly regenerated catalyst and the second partially deactivated catalyst, contacting a hydrocarbon feed containing less than 0.01 wt. percent sulfur with said first bed under reforming conditions in the presence of free hydrogen, thereby partially deactivating the catalyst of said first bed with substantially sulfur-free carbonaceous deposits, directly flowing partially deactivated catalyst from said first bed to said second bed, contacting another hydrocarbon feed containing more than 0.05 wt. percent sulfur with said second bed under reforming conditions in the presence of free hydrogen, thereby further deactivating the catalyst with sulfur and additional carbonaceous deposits, commingling vaporous reaction products from said beds, withdrawing the combined reaction products overhead from said reaction zone, withdrawing spent catalyst from said second bed, regenerating the catalyst so withdrawn and returning the regenerated catalyst to said first bed.

2. The process of claim 1 wherein said beds are adjacent, being sepaarted by a vertical partition, and wherein catalyst flows from said first bed to said second bed underneath said partition, and said vaporous reaction products are commingled in a common disperse solids phase above said beds.

3. The process of claim 1 wherein said first bed is superposed above the second in said reaction zone, wherein catalyst flows directly downward from said first bed to the second, and wherein the vaporous reaction products from said second bed flow up through said first bed to a disperse solids phase thereabove.

4. The process of claim 1 wherein said spent catalyst is oxidatively regenerated by contact with a free oxygen-containing gas in stages, the first stage having a low oxygen partial pressure and the final stage having a high oxygen partial pressure.

References Cited in the file of this patent

UNITED STATES PATENTS

| | | |
|---|---|---|
| 2,401,334 | Burk et al. | June 4, 1946 |
| 2,414,002 | Thomas et al. | Jan. 7, 1947 |
| 2,414,951 | Jasaitis et al. | Jan. 28, 1947 |
| 2,468,508 | Munday | Apr. 26, 1949 |
| 2,587,987 | Franklin | Mar. 4, 1952 |
| 2,602,771 | Munday et al. | July 8, 1952 |
| 2,614,068 | Healy et al. | Oct. 14, 1952 |
| 2,642,381 | Dickinson | June 16, 1953 |
| 2,664,967 | Molstedt | Jan. 5, 1954 |